Aug. 10, 1926. 1,595,655
C. F. GROMANN
SIGNAL DEVICE
Filed Feb. 19, 1920  2 Sheets-Sheet 1
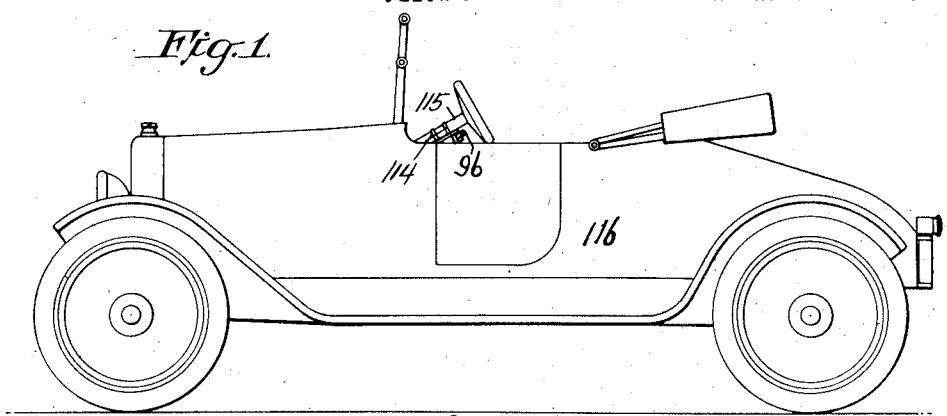
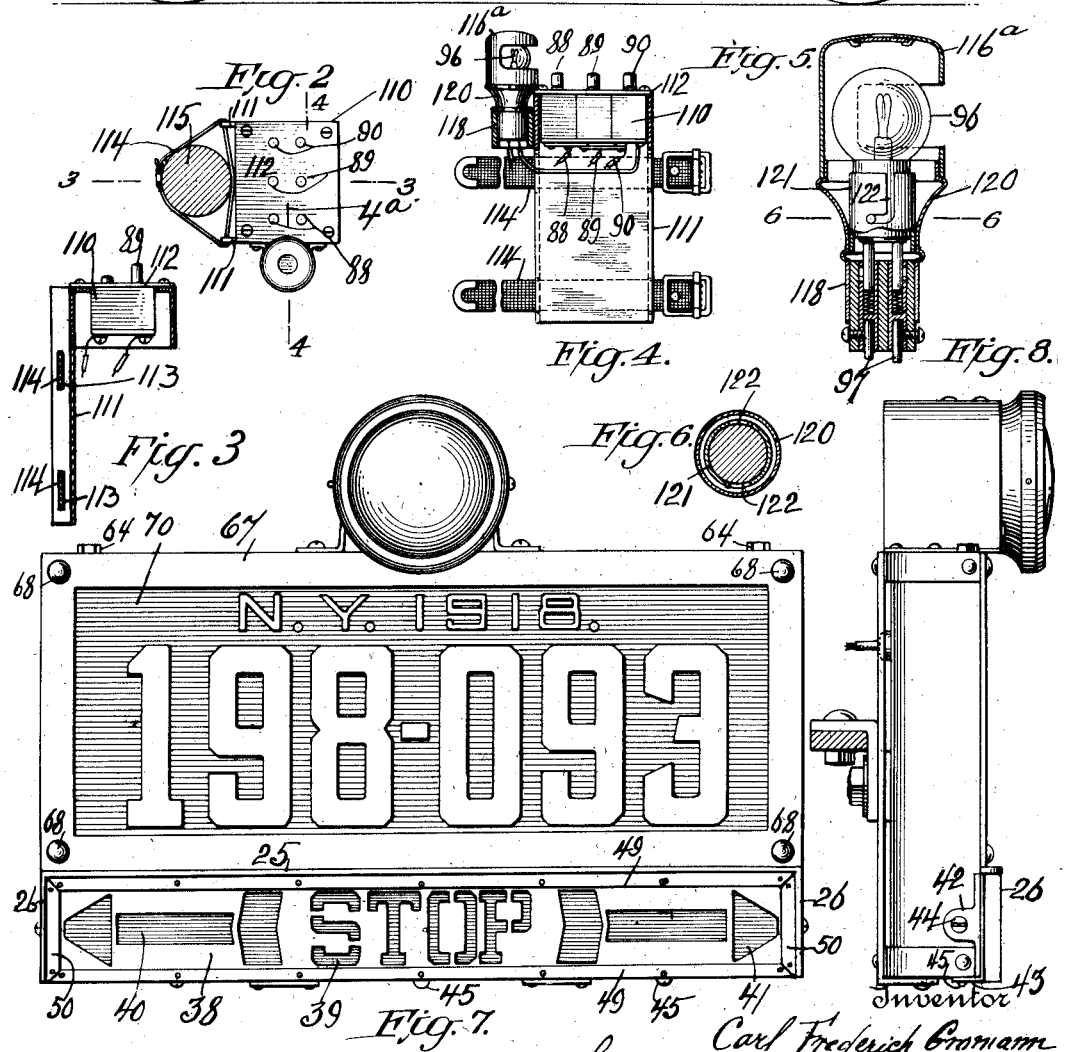

Aug. 10, 1926.
C. F. GROMANN
SIGNAL DEVICE
Filed Feb. 19, 1920
1,595,655
2 Sheets-Sheet 2
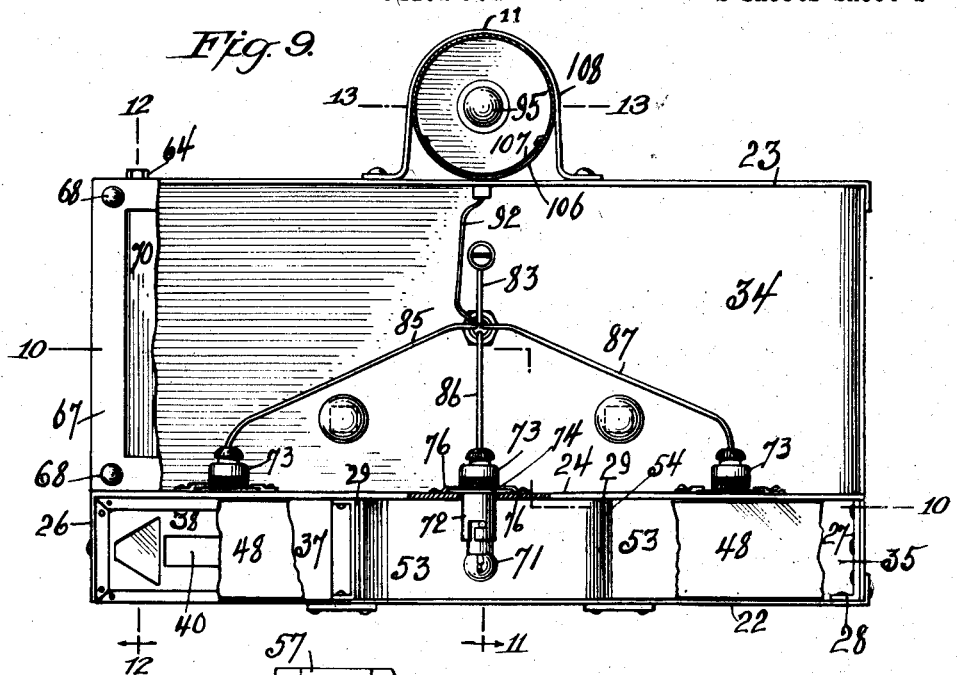
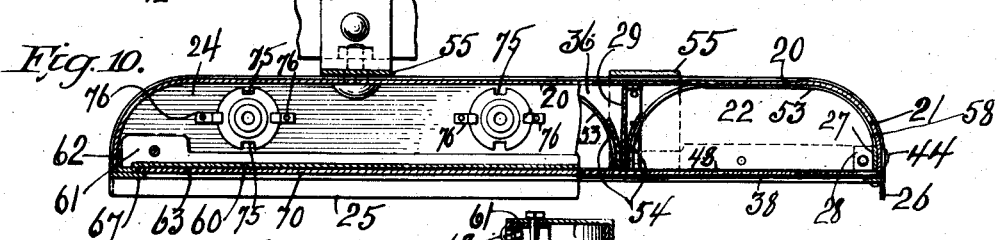
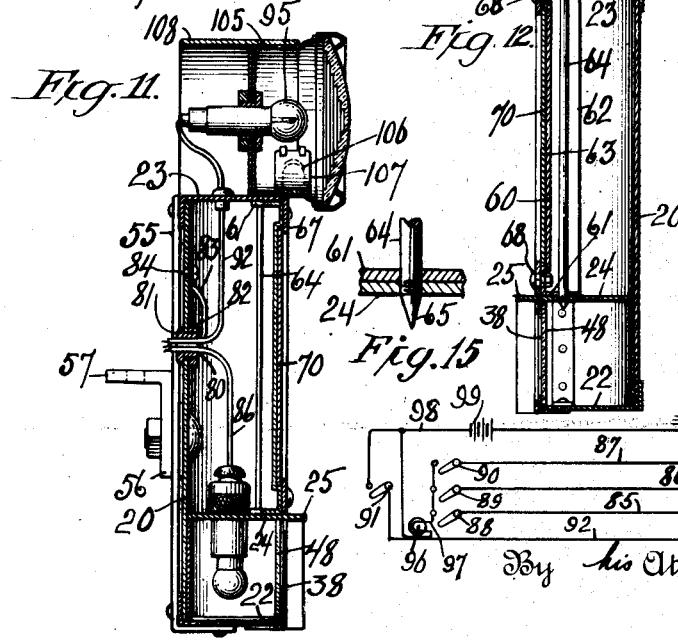
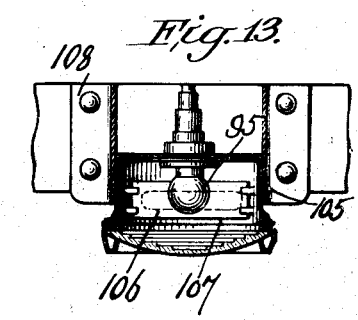

Patented Aug. 10, 1926.

1,595,655

UNITED STATES PATENT OFFICE.

CARL FREDERICH GROMANN, OF NEW YORK, N. Y.

SIGNAL DEVICE.

Application filed February 19, 1920. Serial No. 359,859.

This invention relates to a signal device for automobiles and other vehicles. Its organization includes a signal plate that is provided with shadow projections whereby, the light rays from the tail light of the automobile do not interfere with the functioning of the signal lamps, all of which ledges extend outwardly beyond the front faces of the signal plate 38 and the license plate 70 to be described. The signal lamps are provided with easily operated locking means whereby they are securely held in place. A switch block for the signal lamps is strapped to the steering column of the automobile. The license plate of the device is securely held in place in a pocket of a license plate holder. Other points of novelty of the invention are described in the detailed description of the specification.

Fig. 1 represents a side elevation of an automobile with the signal device connected thereto; Fig. 2 shows a top plan view of the switch box of the device with a cross section of the steering column of the automobile; Fig. 3 is a section of Fig. 2 on the line 3, 3; Fig. 4 represents a partial section of Fig. 2 on the line 4, 4; Fig. 5 represents an enlarged section of Fig. 2 on the line 4, 4ª; Fig. 6 shows a section of Fig. 5 on the line 6, 6; Fig. 7 is an enlarged front elevation of the signal device; Fig. 8 shows a left hand side view of Fig. 7; Fig. 9 is a view similar to Fig. 7 with the front plate broken away; Fig. 10 is section of Fig. 9 on the broken line 10, 10; Fig. 11 shows a partial section of Fig. 9 on the line 11, 11; Fig. 12 represents a section of Fig. 9 on the line 12, 12; Fig. 13 is a section of Fig. 9 on the line 13, 13; Fig. 14 shows a wiring diagram of the device and Fig. 15 represents an enlarged fragmentary portion of Fig. 12.

The signal device comprises a casing consisting of the rear wall or plate 20 curved at its end to form the side walls 21, the bottom wall or plate 22 and the top plate or roof 23. A horizontal partition or roof 24 has formed therewith the horizontal projecting shadow projection 25 integral therewith and the vertical projecting shadow projections 26. Legs 27 each with a foot 28, extend from the partition 24 and are riveted to the end portions of the rear plate 20 and to the bottom plate 22. Vertical flanged partitions 29 bear upon the bottom plate 22 and support the partition 24.

By means of the partitions 24 and 29 there are formed the upper chamber 34 and the lower chambers 35, 36 and 37. A signal plate 38 has shown therein signal perforations, and which in this instance comprise the word Stop indicated by the numeral 39 and arrows indicated by the numerals 40 and 41. The signal plate has formed on its sides the lugs 42 and on its lower portion the flange 43. The flanges 42 are fastened to the side portions of the rear plate 20 by means of the screws 44 and the flange 43 is fastened to the bottom plate 22 by means of the screws 45. A dark colored glass 48 bears against the signal plate 38 from the inside. Strips 49 and 50 are riveted to the signal plate 38.

The signal plate 38 with the glass 48 form a covering for the lower chambers 35, 36 and 37.

Reflectors 53 curved at their ends 58 are located in each of the chambers 35, 36 and 37. The rear faces of the reflectors 53 bear against the rear plate 20 and their ends bear against the glass 48. Each reflector 53 with the horizontal partition 24, the plate 22 and the glass 48 forms a chamber. Pieces of fabric 54 are interposed between the reflectors 53 and the partitions 29. Strengthening angle brackets 55 are riveted to the top plate 23 and to the bottom plate 22. Supporting angle brackets are shown with the legs 56 and 57. The legs 56 are bolted to the rear plate 20 and to the brackets 55. By means of the legs 57 the casing of the device is secured in place of the vehicle. A license plate holder is indicated with the body portion 60, which has formed therewith the similar top and bottom flanges 61 and the similar side flanges 62 to form a pocket 63 for a license plate. To strengthen the casing and maintain it in proper shape bolts 64 extend through the top plate 23, the flanges 61, and are threaded into the partition 24. The bolts 64 are pointed at their lower ends 65 to facilitate locating the threaded portions thereof in place. An annular rim 67 bears against the outer face of the license plate holder having the body portion 60 and bolts 68 fasten said rim to said holder. A license plate 70 is held in place between rim 67 and the pocket 63 of said license plate holder. The license plate is shown with the appropriate state, date and number.

Signal lamps 71 are shown with the sockets 72 and caps 73 with the flanges 74. Slots or notches 75 are formed in the flanges 74. A pair of locking brackets 76 for each flange 74 are fastened to the horizontal partition 24. The said flanges 74 are locked in place by means of the brackets 76, and when it is desired to remove the signal lamps 71, the notches 75 are brought in line with the said brackets 76. The signal lamps 71 extend into the chambers 35, 36 and 37. An insulating sleeve 80 with the flange 81 extends through an opening in rear plate 20 and is locked in place by means of the nut 82. A ground wire 83 has one end connected to the rear plate 20 by means of the screw 84 and its other end is grounded. Wires 85, 86 and 87 extend from the switches 88, 89 and 90 to the signal lamps 71. A switch 91 has leading therefrom a wire 92 which extends to the tail light 95. An indicator light 96 has connected thereto the wire 97 which latter is connected to the contacts of the switches 88, 89 and 90. The wire 97 connects with the wire 98 which is in circuit with the battery 99.

The tail light 95 is shown with the casing 105 which has formed therein the opening 106 at the lower portion thereof. A transparent celluloid strip 107 is secured in place over said opening. The casing 105 is held in place on the top plate 23 by means of the strap 108.

The rays of light from the tail light 95 pass through the opening 106 and thereby illuminate the license plate 70, while the roof 24 and the shadow ledges 25 and 26 constitute barriers to prevent said rays of light illuminating the signal plate 38.

A switch block is indicated at 110 for the switches 88, 89 and 90. Channel shaped supporting brackets 111 are connected to the plate 112 of the switch block 111 and have slotted openings 113 for the straps 114. The switch block is fastened to the steering column 115 of the automobile 116 by means of said straps. The indicator lamp 96 is provided with the perforated hood 116ª and is fastened to the switch block 110 by means of the strap 118. The casing of the indicator lamp is shown at 120. The socket is shown at 121 with the bayonet slots 122. The switch 88 controls the arrow 40. The switch 90 controls the arrow 41 and the switch 89 controls the stop signal 39.

Having described my invention what I desire to secure by Letters Patent and claim is:

In a signal device the combination of a casing, comprising a rear plate with side walls, a bottom wall and a roof, a horizontal partition in the casing having a horizontal projection integral therewith extending beyond the front face thereof and vertical projections extending downwardly from the horizontal partition at the side of the casing, a pair of vertical partitions extending between the bottom wall of the casing and the horizontal partition, the said partitions forming an upper chamber and three lower chambers, a signal plate below the horizontal partition and at the front of the lower chambers, a license plate for the casing above said horizontal partition, a tail light at the top end of the casing, a casing for the tail light having an opening at its lower portion for the light rays of said tail light to illuminate said license plate.

Signed at the borough of Manhattan, city of New York, in the county of New York and State of New York, this 7th day of February A. D. 1920.

CARL FREDERICH GROMANN.